(No Model.)

O. BAGLEY.
EXTENSION NUT FOR AXLES.

No. 533,338. Patented Jan. 29, 1895.

Witnesses
Frank A. Merrill
H. H. Johnson

Inventor
Orin Bagley
By his Attorney

UNITED STATES PATENT OFFICE.

ORIN BAGLEY, OF NORTH SUTTON, NEW HAMPSHIRE.

EXTENSION-NUT FOR AXLES.

SPECIFICATION forming part of Letters Patent No. 533,338, dated January 29, 1895.

Application filed May 11, 1894. Serial No. 510,840. (No model.)

*To all whom it may concern:*

Be it known that I, ORIN BAGLEY, a citizen of the United States, residing at North Sutton, in the county of Merrimac and State of New Hampshire, have invented certain new and useful Improvements in Extension-Nuts; and I do hereby declare the following to be a full, clear, and exact description of the invention, such as will enable others skilled in the art to which it appertains to make and use the same.

This invention is adapted for use upon any vehicle axle requiring washers to take up end slack, the objects being to provide means for avoiding the heating of an axle, and for preventing a nut from being tightened by the rotative motion of a wheel.

To this end my invention consists broadly in a nut composed of two parts.

The heating of wagon axles while sometimes resulting from insufficient lubrication, is more often directly attributable to the involuntary crowding of the nut upon its axle by the motion of a wheel, increasing the friction of the ends of the wheel-hub, the shoulder and nut of the axle, to such an extent as to exert a tendency at least to stop the wheel, if not actually to produce such result. This fault has been recognized and an attempt made at correction by inserting a screw plug in the outer end of an axle, which, if kept in contact with the end of the nut, will keep the latter in its proper position relative to the washers; but as the plug is out of sight when adjusting the nut, the plug has to be set by guess and to set it properly the nut may have to be removed and replaced several times.

My invention as illustrated in the accompanying drawings possesses all the advantages of any such construction as above named, together with the added convenience of having the whole thing in plain sight while adjusting the nut.

The invention will be fully set forth in the following specification and claim, and clearly illustrated in the accompanying drawings forming a part of same, of which—

Figure 1:
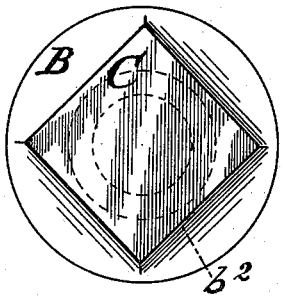
Figure 2:
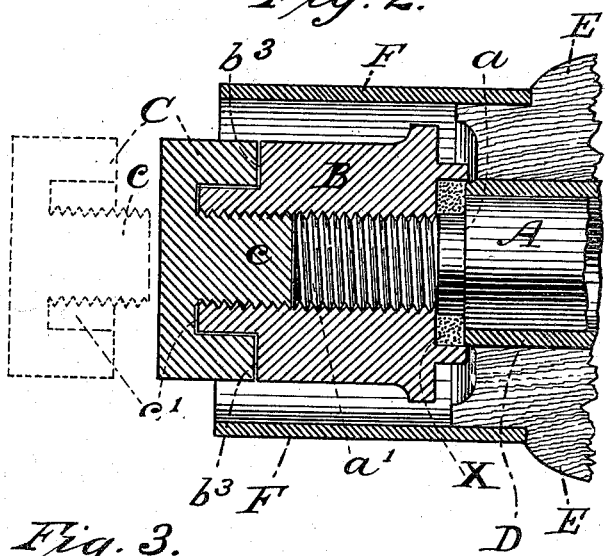
Figure 3:
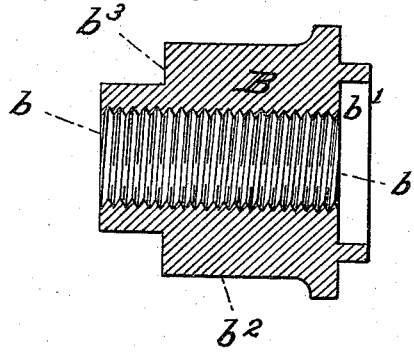

Figure 1, is an end view of my improved extension nut. Fig. 2, is a sectional elevation showing a portion of a wheel hub, its axle box, the axle, and my improved extension nut in its proper relative position as when turned onto the axle far enough to take up the slack, and the cap is also shown detached in dotted lines. Fig. 3, is a sectional elevation of the nut with cap removed.

The axle A, has the usual shoulder $a$, between which and its outer end is the reduced threaded portion $a'$, to which is threaded the retaining nut.

My improved extension nut is composed of two parts B—C, the former having a threaded opening $b$, extending clear through it, and the latter having a threaded plug $c$, fitting the threaded opening $b$, of the part B.

The part B, may be similar to an ordinary nut, *i. e.*, having an enlarged inner end containing the socket $b'$, for introducing a washer X, and its square or hexagonal portion $b^2$, for applying a wrench; the essential difference being that its outer end is open, and its periphery turned down to a shoulder, as at $b^3$, its turned or cylindrical portion thus formed, being adapted to enter an annular groove or socket $c'$, formed in the part C, which serves as an extension cap for the nut proper, the outside of said cap C, being of the same diameter and form as the adjacent portion of the nut B. D, represents a portion of an axle box, which is secured in the ordinary manner with the wheel-hub E, and F, is the metallic hub extension or collar.

To adjust my improved nut, the part B, is turned onto the threaded portion $a'$, of the axle A, until the slack or end motion of the hub E, has been taken up. Then the threaded plug portion $c$, of the cap C, is turned into the threaded opening $b$, of the nut B, until said plug $c$ comes in contact with the end of the threaded portion $a'$, of the axle A, (or, until it can be turned no farther) by which means the improved nut is prevented from tightening itself upon the axle by the rotative motion of the wheel.

Having described my invention, what I claim is—

A wagon-axle nut composed of two parts, the larger having a threaded opening from end to end, and provided at its outer end with a reduced cylindrical portion, and the other having an annular recess for the reception of said cylindrical portion of the larger section, and a threaded plug or projection formed concentric within said recess and adapted to fit and enter the threaded opening of said larger section.

In testimony whereof I affix my signature in presence of two witnesses.

ORIN BAGLEY.

Witnesses:
J. B. THURSTON,
CARRIE E. EVANS.